United States Patent [19]

Raisio

[11] Patent Number: 4,902,189
[45] Date of Patent: Feb. 20, 1990

[54] GATHERING AND GUIDING ARRANGEMENT FOR THE LOADING AND UNLOADING OF CONTAINERS OR PLATFORMS ONTO VEHICLES

[75] Inventor: Reijo J. Raisio, Shrewsbury, United Kingdom

[73] Assignee: Multilift Limited, United Kingdom

[21] Appl. No.: 786,968

[22] PCT Filed: Jan. 30, 1985

[86] PCT No.: PCT/GB85/00044
§ 371 Date: Oct. 3, 1985
§ 102(e) Date: Oct. 3, 1985

[87] PCT Pub. No.: WO85/03482
PCT Pub. Date: Aug. 15, 1985

[30] Foreign Application Priority Data
Feb. 3, 1984 [GB] United Kingdom ............. 8402963

[51] Int. Cl.⁴ .......................................... B60P 1/64
[52] U.S. Cl. ...................................... 414/498; 414/534; 414/529; 280/414.1; 193/35 R
[58] Field of Search ............... 414/529, 498, 499, 500, 414/530, 531, 532, 533, 534, 535; 280/414.1; 193/35 R, 35 C

[56] References Cited

U.S. PATENT DOCUMENTS

| | | | |
|---|---|---|---|
| 3,438,524 | 4/1969 | Snodgrass | 414/534 X |
| 3,656,639 | 4/1972 | Lothen | 414/529 |
| 3,842,998 | 10/1974 | Borum | |
| 4,500,249 | 2/1985 | Johansson | 414/534 |

FOREIGN PATENT DOCUMENTS

| | | |
|---|---|---|
| 3137139 | 4/1982 | Fed. Rep. of Germany . |
| 2407095 | 5/1979 | France . |
| 965975 | 8/1964 | United Kingdom . |
| 1234147 | 6/1971 | United Kingdom . |
| 2008545 | 6/1979 | United Kingdom . |
| 2033346 | 5/1980 | United Kingdom . |

Primary Examiner—Frank E. Werner
Attorney, Agent, or Firm—Lalos & Keegan

[57] ABSTRACT

A vehicle for carrying a container or platform has a lifting mechanism for loading the container or platform onto the vehicle. There are roller devices (10,12) rotatable about a substantially horizontal axis and located at the rear of the vehicle. A gathering and guiding device, preferably a rotatable roller (16), is located at each side of the vehicle forwardly of the roller device and positioned to be encountered by and to guide and centralize the container during a loading operation.

20 Claims, 3 Drawing Sheets

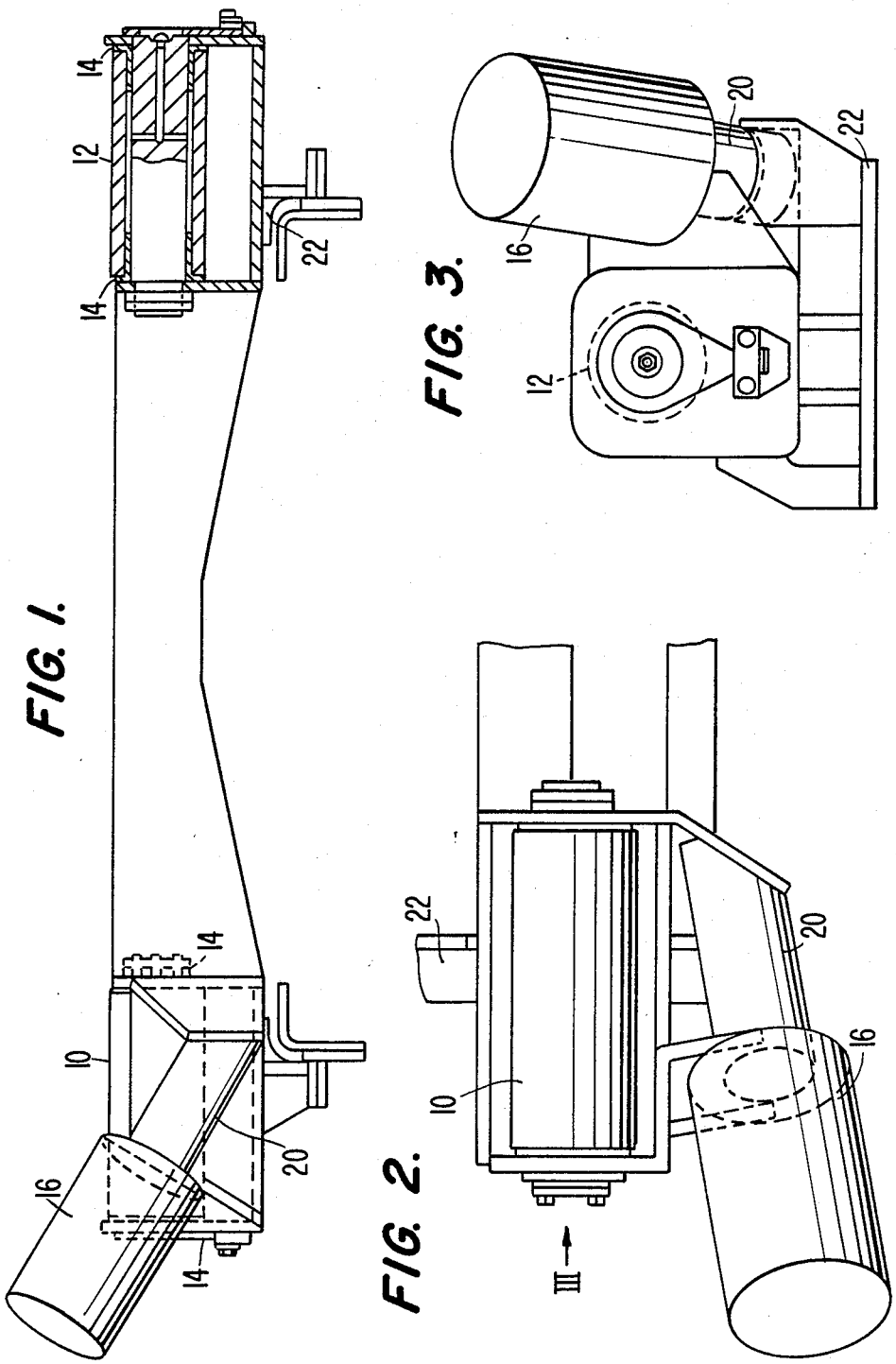

GATHERING AND GUIDING ARRANGEMENT FOR THE LOADING AND UNLOADING OF CONTAINERS OR PLATFORMS ONTO VEHICLES

This invention relates to a gathering and guiding arrangement for the loading and unloading of containers or platforms onto vehicles.

It is customary, as shown for example in British Pat. No. 2 033 346, FIG. 1, see part 19, to provide rollers at the rear of a vehicle which is to carry a mountable and demountable container or platform. Often to accommodate minor misalignment between the fore and aft axis of the vehicle and the fore and aft axis of the container, the rollers are shaped with inwardly sloping substantially frusto-conical outer ends. It has been found that under many conditions, e.g. darkness, poor visibility, uneven ground, sloping ground, and restricted area for maneuvering the vehicle, that this arrangement is not adequate to cope with the minimum misalignment which the vehicle driver can reasonably achieve. It will be realized that the driver normally has only restricted vision in a rearward direction and that difficulties are particularly acute with long vehicles.

In order to provide greater gathering capacity it is not practical to extend the frusto-conical outer end as the resultant increase in maximum diameter would foul the underside of the body members, and also increase the overall length of the chassis which could be undesirable.

Further that the gathering characteristic of the frusto-conical member (roller) is such that there will be a point loading on the conical section at a position in the loading cycle when the rear end of the body is still on the ground. Thus the centralising or gathering function of the conical roller will be resisted by the ground contact of the body causing the still misaligned body to take up an attitude where there will be point loading at both sides of the vehicle.

The above sequence will tend to distort the body members and will apply undesirable side loads to the lifting equipment.

In practice the task of maneuvering a vehicle into the proper position ready to pick up a container is often very time consuming, and to attempt a lift when the misalignment is too great may be very dangerous. It would be particularly dangerous if the vehicle was on a side slope as the lifting of a heavy or loaded container raises its center of gravity several feet (metres) above the ground and the side force may tip the vehicle over sideways.

It would be highly desirable if there was an effective mechanism so that a greater misalignment can be tolerated and safer operation achieved, than in prior art designs.

According to the invention, there is provided a vehicle for carrying a container or platform and having a lifting mechanism for loading the container or platform onto the vehicle, there being roller means rotatable about a substantially horizontal axis and located at the rear of the vehicle, characterized in that a gathering and guiding means is located at each side of the vehicle forward of the roller means and positioned to be encountered by and to guide and centralize the container during a loading operation.

In a preferred embodiment of the invention, the gathering and guiding means is located so that it is encountered by a side edge of the container shortly after the rear end of the container has left the ground.

In a more preferred embodiment of the invention, the gathering and guiding means is constituted by a rotatable roller whose rotation axis extends, in a direction outwardly of the vehicle, upwardly and forwardly. The said rotation axis may extend in a direction such that its projection onto a vertical transverse plane perpendicular to the vehicle fore and aft axis is a line between about 20 and 75, preferably 25 and 50, degrees to the horizontal. The projection of the said rotation axis onto a vertical central plane of the vehicle may be a line between 20 and 90 degrees to the horizontal, but it is preferred that this angle should be between about 20 and 75 degrees. In quoting these figures, and in the description herein, it is assumed that the vehicle is standing on a horizontal surface.

In an alternative embodiment of the invention, the gathering and guiding means may be formed by a robust guide plate, flat or curved, and located appropriately to effect a centralizing action on the container as it is pulled and lifted onto the vehicle by the loading mechanism.

The invention will be better understood from the following non-limiting description of an example thereof given with reference to the accompanying drawings in which:

FIG. 1 is an end elevation, partly in section, looking rearwardly, showing an example of an arrangement in accordance with the invention;

FIG. 2 is a plan view of the left-hand side of the arrangement shown in FIG. 1;

FIG. 3 is a side elevation looking in the Direction III indicated in FIG. 3.

Figure 4:
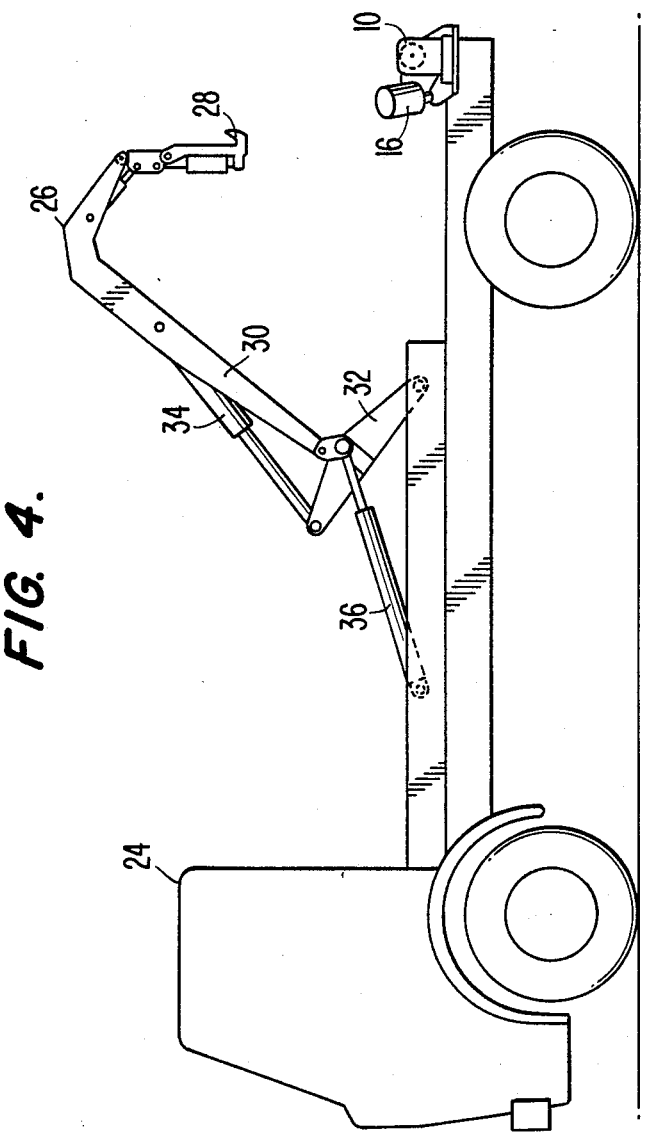
FIG. 4 is a side view of a typical vehicle on which the gathering and guiding arrangement illustrated in FIGS. 1-3 may be mounted.

The gathering and guiding arrangement illustrated in FIGS. 1-3 may be mounted at the rear of a vehicle for carrying a container. The vehicles shown in British Specification Pat. Nos. 1 327 928, 1 371 811, 1 416 864, 1 540 611 and 2 033 346 are examples of vehicles to which the present invention can be applied.

The illustrated arrangement includes rear rollers 10,12 mounted at the rear of the vehicle for free rotation about a common horizontal axis. Each roller is mounted in suitable bearings, the bearings being indicated at 14 in FIG. 1. In contrast to the frusto-conical ended rollers conventionally used in prior art arrangements, the rollers 10 and 12 are both cylindrical, and have a greater axial extent, e.g. being 1½ times or twice as long as a conventional roller.

A gathering and guiding means constituted in this embodiment of the invention by a roller 16 is provided at each side of the vehicle 24 forwardly of the rollers 10, 12. Each roller 16 is mounted for free rotation on a shaft 20, there being suitable bearings internally of the roller to mount the roller on the shaft 20. The shafts 20 are both angled forwardly and upwardly so that the axes of rotation of the rollers 16 are disposed as described hereinabove. The vehicle chassis-frame is indicated at 22. Each roller 16 is preferably substantially cylindrical in shape as illustrated. Alternatively, however, each roller 16 may be tapered, that is to say, may be shaped as a frustum of a cone with the larger diameter end outwardly of the vehicle.

The rollers 16 are mounted in relation to the rollers 10,12 and the path of travel of the lifting mechanism 26 when loading a container onto the vehicle in such a manner that a misaligned container contacts one, then both of the rollers 10,12 taking the vertical reaction resulting in rear of body leaving the ground. Following this the container makes contact with one of the rollers 16. The main weight of the container is then supported at two regions, i.e. by the hook 28 (and the lifting mechanism 26 to which it is attached) and the rollers 10, 12. As the lifting mechanism continues its travel in conventional manner the container continues to contact the gathering and guiding means and is thus centralized and guided to a proper position on the vehicle.

In a container loading operation, the surface of the roller 16 first contacted by a side of a container underside longitudinal structural member is located a considerable distance laterally outwardly of the vehicle, and as a consequence the capability of the vehicle to safely load a container when the vehicle and container are misaligned is improved; in other words, an arrangement in accordance with the invention can cope more safely with a greater degree of misalignment than prior art arrangement.

In a preferred embodiment of the invention, the lifting mechanism 26 includes at least two relatively pivotable frames 30 and 32, movable in a substantially vertical plane, and driven by respective fluid-operable piston-cylinder devices 34 and 36, respectively. An example of this kind of arrangement is the vehicle disclosed and claimed in British Pat. No. 2,033,346.

What is claimed is:

1. A vehicle for carrying a load-carrying means and having a lifting mechanism for loading the load-carrying means onto the vehicle over the rear of the vehicle, there being roller means rotatable about a substantially horizontal axis and located at the rear of the vehicle, characterized in that a gathering and guiding means constituted by a rotatable roller whose rotation axis extends, in a direction outwardly of the vehicle, upwardly and forwardly, is located at each side of the vehicle forwardly of the roller means and is positioned to be encountered by and to guide and centralize the load-carrying means during a loading operation.

2. A vehicle according to Claim 1 in which the gathering and guiding means is located so that it is encountered by a side edge of the load-carrying means shortly after the rear end of the load-carrying means has left the ground.

3. A vehicle according to Claim 2 in which said rotation axis extends in a direction such that its projection onto a vertical transverse plane perpendicular to the vehicle fore and aft axis is a line between about 20 and 60 degrees to the horizontal, and such that its projection onto a vertical central plane of the vehicle is a line between about 25 and 50 degrees to the horizontal.

4. A vehicle according to Claim 2 in which each rotatable roller is substantially cylindrical.

5. A vehicle according to Claim 2 in which each rotatable roller is tapered, that is, shaped as a frustum of a cone with the larger diameter end outwardly of the vehicle.

6. A vehicle according to Claim 2 in which each rotatable roller has an axial length greater than its maximum diameter.

7. A vehicle according to Claim 2 in which bearings are located internally of each roller to mount each roller on a respective shaft.

8. A vehicle according to Claim 1 in which said rotation axis extends in a direction such that its projection onto a vertical transverse plane perpendicular to the vehicle fore and aft axis is a line between about 20 and 60 degrees to the horizontal, and such that its projection onto a vertical central plane of the vehicle is a line between about 25 and 50 degrees to the horizontal.

9. A vehicle according to Claim 8 in which each rotatable roller is substantially cylindrical.

10. A vehicle according to Claim 8 in which each rotatable roller is tapered, that is, shaped as a frustum of a cone with the larger diameter end outwardly of the vehicle.

11. A vehicle according to Claim 8 in which each rotatable roller has an axial length greater than its maximum diameter.

12. A vehicle according to Claim 8 in which bearings are located internally of each roller to mount each roller on a respective shaft.

13. A vehicle as in any preceding claim in which the lifting mechanism includes at least two relatively pivotable frames, movable in a substantially vertical plane, and driven by respective fluid-operable piston-cylinder devices.

14. A vehicle according to Claim 1 in which each rotatable roller is substantially cylindrical.

15. A vehicle according to Claim 1 in which each rotatable roller is tapered, that is, shaped as a frustum of a cone with the larger diameter end outwardly of the vehicle.

16. A vehicle according to Claim 1 in which each rotatable roller has an axial length greater than its maximum diameter.

17. A vehicle according to Claim 1 in which bearings are located internally of each roller to mount each roller on a respective shaft.

18. A vehicle according to Claim 1, wherein said load-carrying means comprises a container.

19. A vehicle according to Claim 1, wherein said load-carrying means comprises a platform.

20. A vehicle for carrying load-carrying means comprising a lifting mechanism having at least one pivotable frame movable in a substantially vertical plane and being operable to lift said load-carrying means onto the vehicle over the rear of the vehicle, there being roller means rotatable about a substantially horizontal axis and located at the rear of the vehicle, and a gathering and guiding means constituted by a rotatable roller whose rotation axis extends, in a direction outwardly of the vehicle, upwardly and forwardly, is located at each side of the vehicle forwardly of the roller means and is positioned to be encountered by and to guide and centralize the load-carrying means during a loading operation.

* * * * *